(12) United States Patent
Farshidi et al.

(10) Patent No.: US 10,198,551 B1
(45) Date of Patent: Feb. 5, 2019

(54) CLOCK CELL LIBRARY SELECTION

(71) Applicant: Cadence Design Systems, Inc., San Jose, CA (US)

(72) Inventors: Amin Farshidi, Austin, TX (US); Zhuo Li, Austin, TX (US); Charles Jay Alpert, Cedar Park, TX (US); William Robert Reece, Over (GB)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/680,646

(22) Filed: Aug. 18, 2017

(51) Int. Cl.
*G06F 17/50* (2006.01)
(52) U.S. Cl.
CPC ........ *G06F 17/5081* (2013.01); *G06F 17/505* (2013.01)
(58) Field of Classification Search
CPC .................................................... G06F 17/505
USPC ................................................ 716/101, 102
See application file for complete search history.

(56) References Cited

U.S. PATENT DOCUMENTS

| 5,740,071 | A  | * | 4/1998  | Leipold ............... G06F 17/5068 |
|           |    |   |         | 716/52 |
| 6,941,533 | B2 | * | 9/2005  | Andreev et al. .......... G06F 1/10 |
|           |    |   |         | 716/105 |
| 9,183,335 | B2 | * | 11/2015 | Ma et al. ............... G06F 17/505 |
| 2002/0107025 | A1 | * | 8/2002 | Oliveira ................ H04W 48/16 |
|           |    |   |         | 455/452.2 |
| 2004/0078766 | A1 | * | 4/2004 | Andreev et al. .......... G06F 1/10 |
|           |    |   |         | 716/105 |
| 2011/0260764 | A1 | * | 10/2011 | Kitahara et al. ...... G06F 17/505 |
|           |    |   |         | 327/202 |
| 2018/0068907 | A1 | * | 3/2018 | Kim et al. .......... G03F 7/70483 |

* cited by examiner

*Primary Examiner* — Sun Lin
(74) *Attorney, Agent, or Firm* — Schwegman Lundberg & Woessner, P.A.

(57) ABSTRACT

Systems, methods, media, and other such embodiments described herein relate to trimming cell lists prior to generation of a routing tree for a circuit design. One embodiment involves accessing a cell library including cell data and a cell list for a plurality of cells. Specialized delay cells are removed from the cell list, and remaining cells are analyzed to identify a set of cell characteristics. Cells are then trimmed from the cell list based on comparisons between the cell characteristics of the remaining cells. If certain cells are sufficiently similar, secondary characteristics can be used to further trim the cell list. The trimmed cell list can then be used to generate a routing tree for the circuit design according to associated design criteria.

20 Claims, 11 Drawing Sheets

CLOCK CELL LIBRARY SELECTION

TECHNICAL FIELD

Embodiments described herein relate to electronic design automation (EDA), and to systems, methods, devices, and instructions for generating circuit designs, including routing-tree-based cells selected from a cell library, and the selection of cells for inclusion in such a cell library.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks are also part of such EDA system operations. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to electronic design automation (EDA) and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, may have a single source, with hundreds or thousands of destination sinks. Additionally, the design may have limits on the amount of time a signal can take to get to the furthest sink (e.g., a maximum arrival time) as well as limits on the differences between arrival times at various sinks and limits on the total wavelength in a tree.

As part of clock tree synthesis, buffer cells, inverter cells, and delay cells from a cell library may be added to a clock tree routing to improve a skew of the clock tree or to meet other performance criteria of a circuit design that includes the clock tree. These cells may be automatically selected from a cell library as part of an EDA clock tree synthesis process. If, however, the cell library includes a large number of cells, the process for synthesizing the clock tree may take much longer than with a cell library that has been adjusted to limit the number of possible cells to use. Various embodiments described herein analyze a cell library to be used with clock tree synthesis for a circuit design, and remove certain cells from consideration. In some embodiments, this significantly reduces the processing time required for clock tree synthesis. This reduction may be particularly present during early stages of a design process, when cells to be used may not yet be identified, and processing of a complete cell library in repeated design processes is extremely time consuming.

Figure 1:
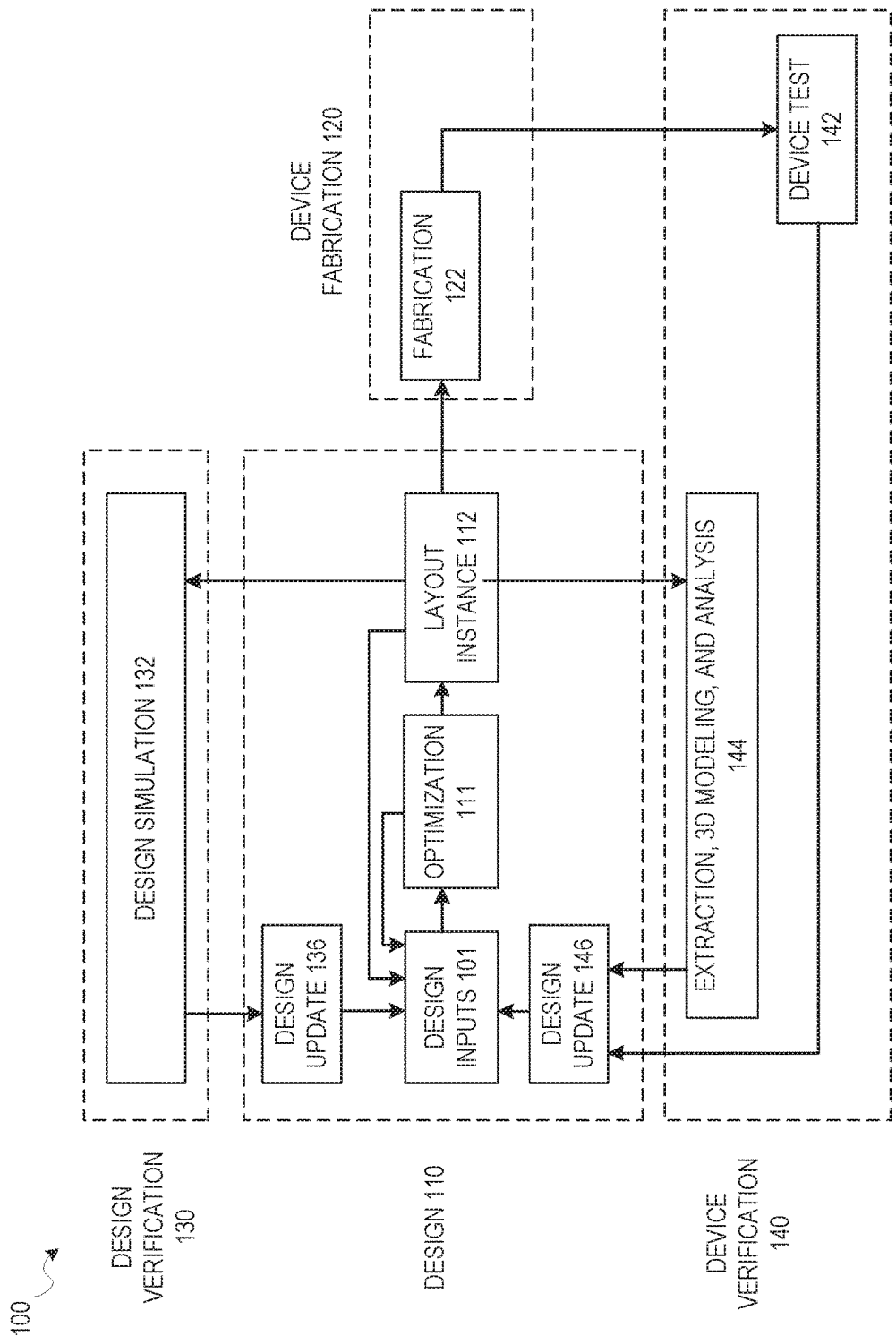
FIG. 1 is a diagram illustrating one possible design process flow which includes elements for clock cell library selection in accordance with some embodiments.

FIG. 1 is a diagram illustrating one possible design process flow which includes elements for clock cell library selection (e.g., library trimming) along with associated routing tree generation in accordance with some embodiments. This includes possible design process flows for analyzing circuit constraints with timing and signal integrity analysis to generate a circuit design and an associated circuit in accordance with various example embodiments, and operations for modifying such circuits automatically to generate routing tree structures that comply with the circuit design criteria (e.g., limits on skew, wire length, maximum arrival time, and other such timing considerations.) It will be apparent that other design flow operations may function using the timing constraints and optimizations described herein, but design flow 100 is described here for the purposes of illustration.

As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure connecting a source and sinks are generated, before adjustments are made to ensure that timing is met. A cell library may be trimmed at any point, and then used in adjustments to the clock tree. The initial strategy, tactics, and context for the device to be created are also generated in the design input operation 101, depending on the particular design algorithm to be used.

In some embodiments, following an initial selection of design values in design input operation 101, updates to an initial routing tree may be generated in accordance with various embodiments described herein during optimization operation 111 or layout instance 112, along with any other automated design processes. As described below, design constraints for a routing tree structure and sinks which receive a signal via the routing tree structure may be initiated with design inputs in design input operation 101, and then may be analyzed using timing analysis according to various embodiments.

In accordance with embodiments described herein, a cell library including buffer and inverter cells, which may be added to the routing tree structure to meet design criteria, may be accessed and used in the clock tree synthesis. The cell library may be trimmed by selecting a subset of the cells for use at any time prior to the library being accessed and cells from the library selected for inclusion in the routing tree structure. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating and updating a routing tree structure may therefore involve iterations of design input operation 101, optimization operation 111, and layout instance 112 generation. In other systems, other design processes may be used. In any such embodiment, the cell library may be trimmed to limit the number of cells analyzed during any number of iterations of clock tree design updates.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D modeling, and analysis 144 operations. Once the device is generated, the device can be tested as part of device test 142 operations, and layout modifications generated based on actual device performance.

As described in more detail below, design updates 136 from design simulation 132; design updates 146 from device test 142 or extraction, 3D modeling, and analysis 144 operations; or direct design input operation 101 may occur after an initial layout instance 112 is generated. In various embodiments, whenever design inputs are used to update or change an aspect of a circuit design, a timing analysis and optimization operation 111 may be performed, and associated modifications to the design made (e.g., including modifications using cells from a trimmed cell library to reduce analysis time in selecting cells from an untrimmed library).

Figure 2C:
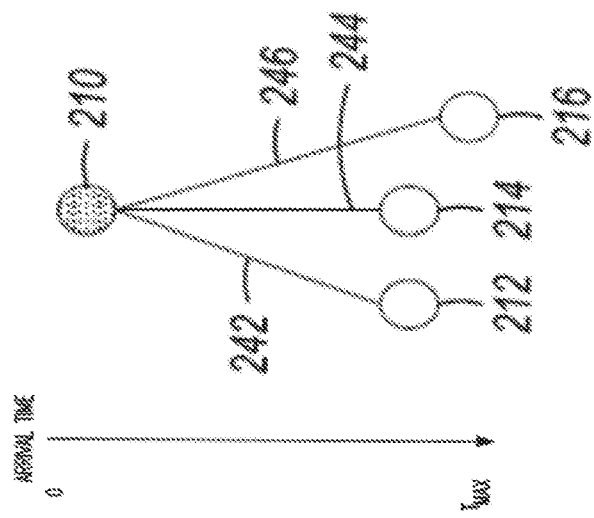
FIG. 2C illustrates aspects of clock tree synthesis using a clock cell library in accordance with some embodiments described herein.
Figure 2B:
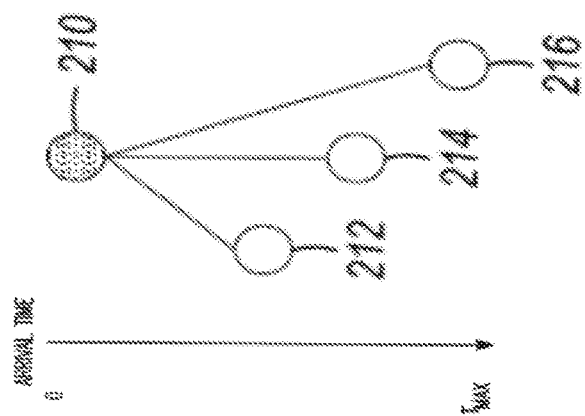
FIG. 2B illustrates aspects of clock tree synthesis using a clock cell library in accordance with some embodiments described herein.
Figure 2A:
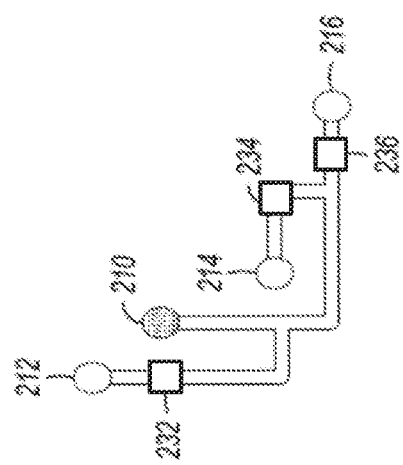
FIG. 2A illustrates aspects of clock tree synthesis using a clock cell library in accordance with some embodiments described herein.

FIGS. 2A-C illustrate aspects of clock tree synthesis using a clock cell library in accordance with some embodiments described herein. These figures particularly show cells added to a routing tree. These cells may serve a variety of purposes, including simple buffering, inverting, delays for skew adjustment, or any other such function to enable the routing tree to meet circuit design criteria. For example, as described above, skew is the difference between an earliest arrival time and a latest arrival time in a routing tree. In some embodiments, this is based simply on wire length from the source to each sink. In other embodiments, other factors may affect the arrival time for each sink, such as the inclusion of various cells within the routing tree.

FIGS. 2A-C show source 210 and sinks 212, 214, and 216. FIG. 2A illustrates a simple routing tree connecting these circuit elements. Additionally, FIG. 2A shows placement areas 232, 234, and 236 where cells from a cell library may be added to a routing tree to adjust characteristics of the routing tree to meet circuit design criteria. FIG. 2B shows a timing diagram for a signal traveling from source 210 to sinks 212, 214, and 216 with no cells added to adjust the signal travel time. FIG. 2B may be viewed as illustrating the skew of an example routing tree, which is the difference in arrival time between an arrival time associated with sink 212 and an arrival time associated with sink 214. By adding particularly selected cells from a cell library in placement areas 232, 234, and/or 236, the skew illustrated by FIG. 2B can be lowered, as illustrated in FIG. 2C. FIG. 2C shows delays 242, 244, and 246, which have been adjusted using cells inserted in the routing tree in order to reduce the skew. The skew does not need to be reduced to zero, but may simply be reduced to within a skew threshold for a particular circuit design that includes the routing tree.

Additionally, cells may be added to a routing tree for other reasons besides skew adjustment. As mentioned above, the clock tree synthesis process may analyze an initial routing tree and determine that cells are to be added to the routing tree. The particular cells to be used are selected from a cell library. In some embodiments, a designer may customize a cell library to be used, but in other embodiments, a designer may simply use a default library or may specify that all available cells be considered.

Figure 3:
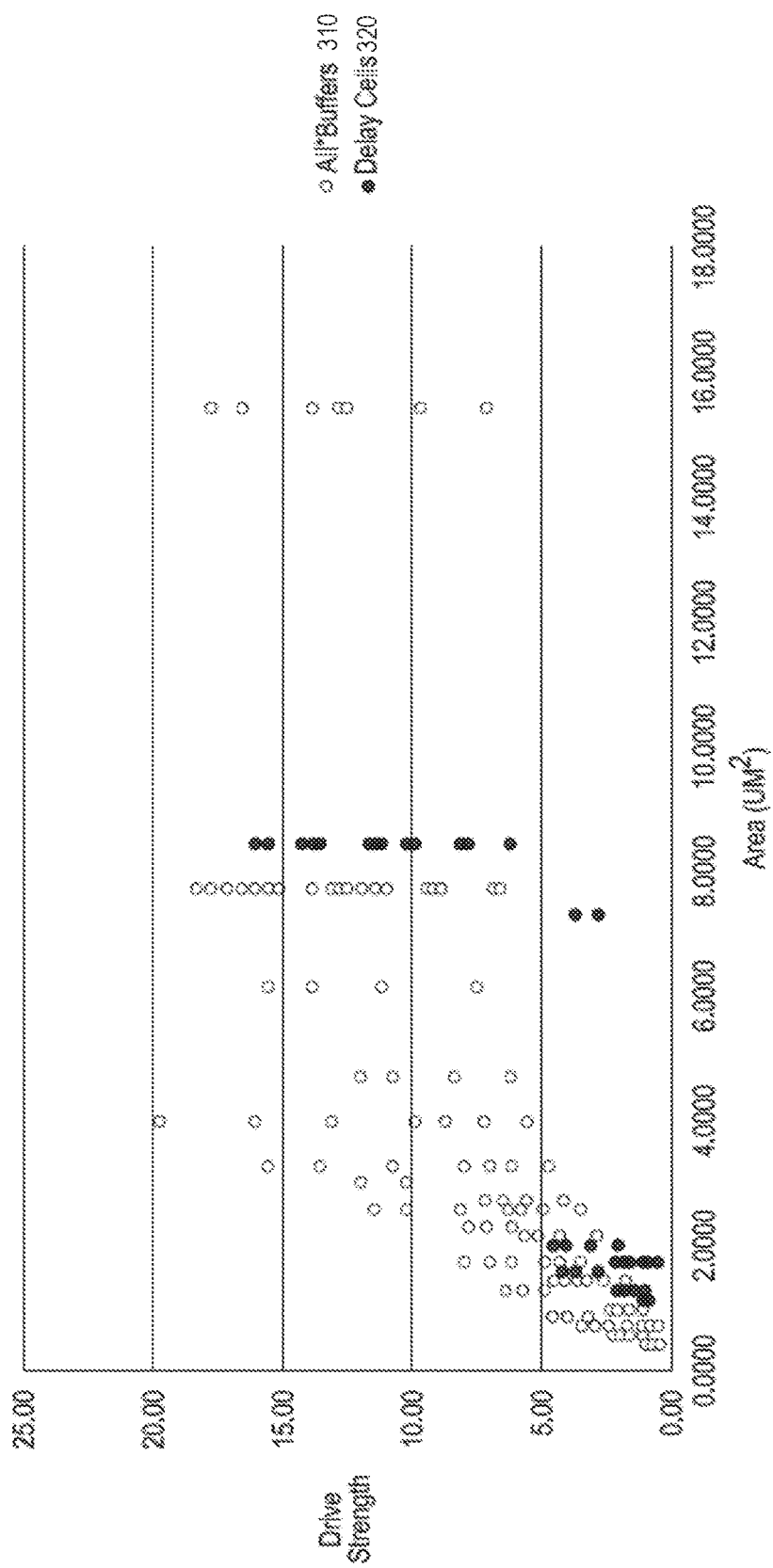
FIG. 3 illustrates aspects of clock cell library selection in accordance with some embodiments described herein.

FIGS. 3-6 illustrate aspects of clock cell library selection in accordance with some embodiments described herein. FIG. 3 illustrates a clock cell library, which includes both delay cells 320 and buffer cells 310. These cells 310, 320 are shown plotted with each cell associated with a point, and placed on the graph of FIG. 3 based on an area associated with the cell and a drive strength associated with the cell. In other embodiments, other criteria, such as power consumption, may be used in place of cell area. In still further embodiments, any relevant criteria for assessing a cell against another cell may be used.

Delay cells 320 may be considered cells with varying delay values which are identified as present for adjusting arrival times to sinks for skew adjustment and other timing variations. In other embodiments, other specific criteria for identifying delay cells 320 may be used.

The remaining cells illustrated in FIG. 3 are buffer cells 310. In some embodiments, this includes both buffer and inverter cells, which may be identified in a shared list or in separate lists as part of the cell library. In some embodiments, delay cells 320 are initially identified within a cell library, and the delay cells 320 are removed from the buffer and inverter lists. The library with the delay cells 320 removed from the buffer and inverter lists may be considered an initial updated library which is to be trimmed.

Figure 4:
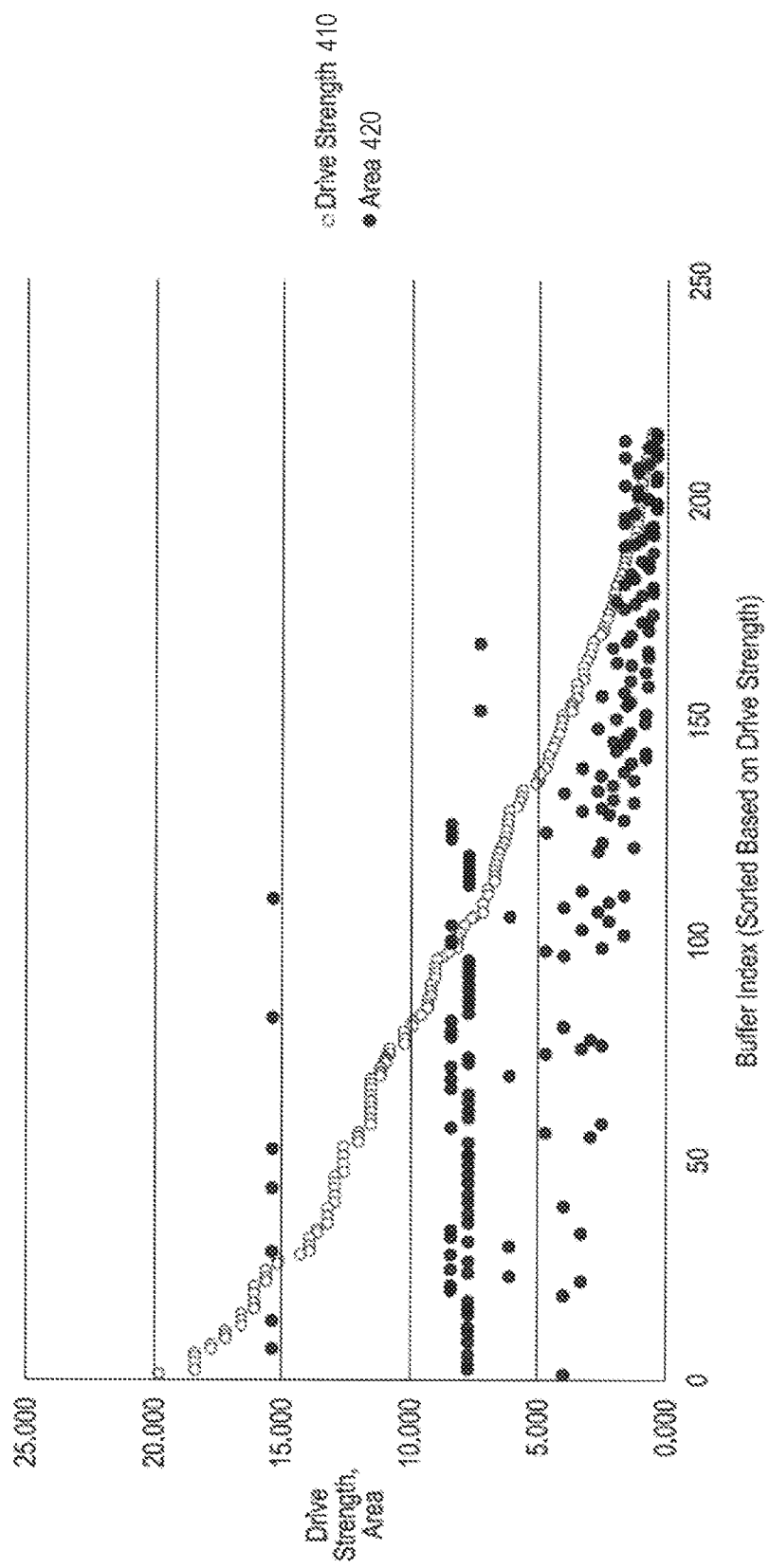
FIG. 4 illustrates aspects of clock cell library selection in accordance with some embodiments described herein.

FIG. 4 then illustrates the buffer cells 310 of FIG. 3 sorted based on drive strength values 410. Each buffer is assigned an index value. The example of FIG. 4 shows roughly 220 buffer cells 310 are indexed with values on the x-axis. For each cell of the updated library, both drive strength values 410 and area values 420 are plotted. As can be seen, area and drive strength are not directly correlated for all cells. In embodiments where these two criteria are considered the primary criteria, cells with a smaller area and a greater drive strength may be considered strictly better than cells with a larger area and a smaller drive strength. In such a situation, the better cells may be kept in the trimmed library, and the other cells removed and not considered during clock tree synthesis analysis.

Figure 5:
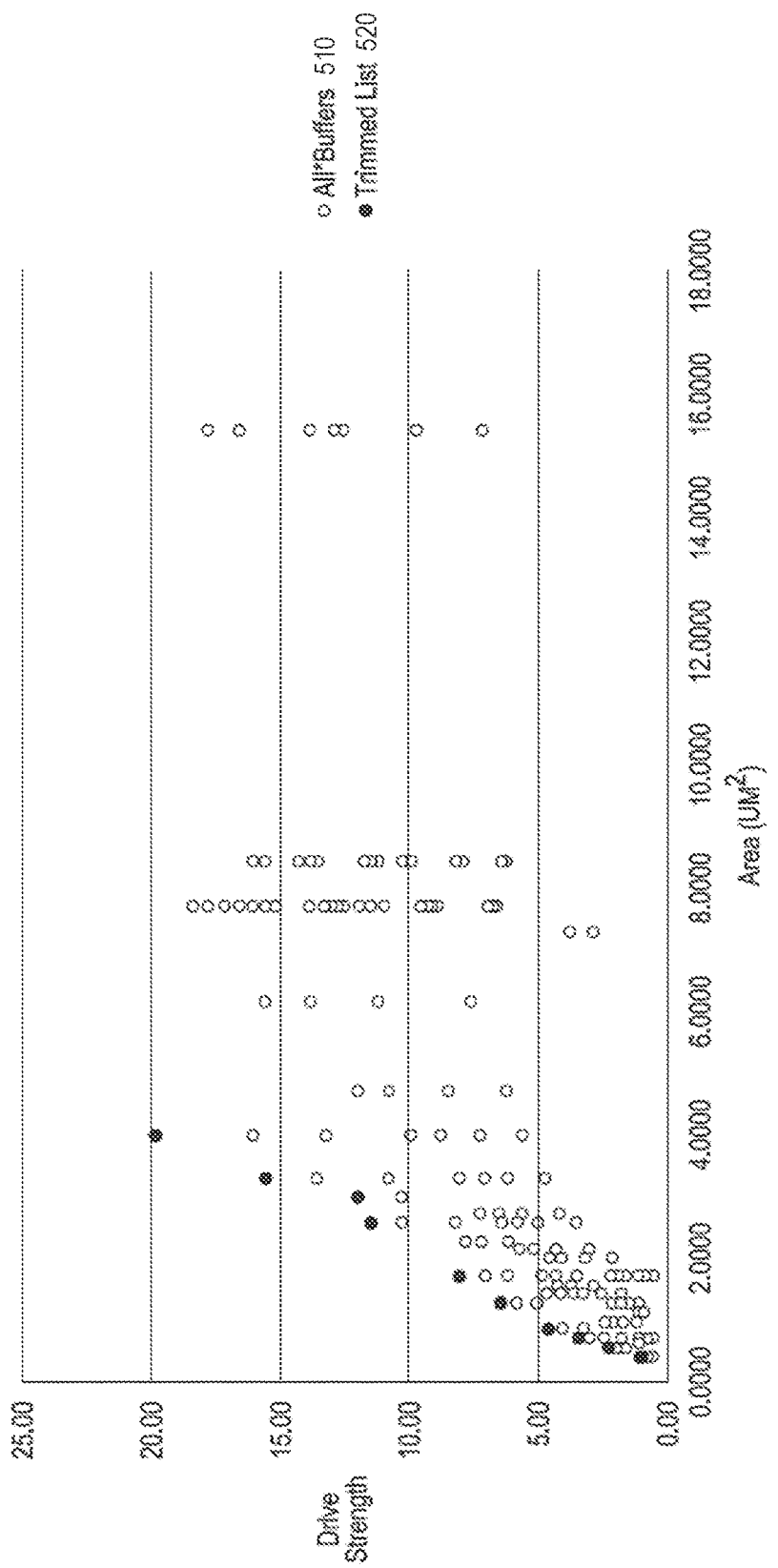
FIG. 5 illustrates aspects of clock cell library selection in accordance with some embodiments described herein.

FIG. 5 illustrates the same cells of FIG. 4, but charted again with each individual cell associated with a single plotted point, positioned based on cell area and drive strength. The trimmed list cells 520 are cells selected and removed from the remaining list of buffers 510 by comparison based on the criteria mentioned above. Cells to be removed and not considered during clock tree synthesis (e.g., trimmed) may be called "dominated" or "worse" cells. These dominated cells may be determined by identifying cells of a given area with the largest drive strength and adding them to trimmed list cells 520, and considering all other cells as dominated. The trimmed list cells 520 may also be generated by selecting cells randomly. For a selected cell, all cells with an equal or larger cell area and a smaller cell drive strength are considered dominated. This process may proceed until all cells have been considered or listed as dominated. For cells that are substantially similar (e.g., having area and drive strength within threshold values), secondary characteristics may be considered, as detailed further below. Such secondary characteristics may essentially operate as tie-breakers to further limit the number of cells to be considered during clock tree synthesis.

Figure 6:
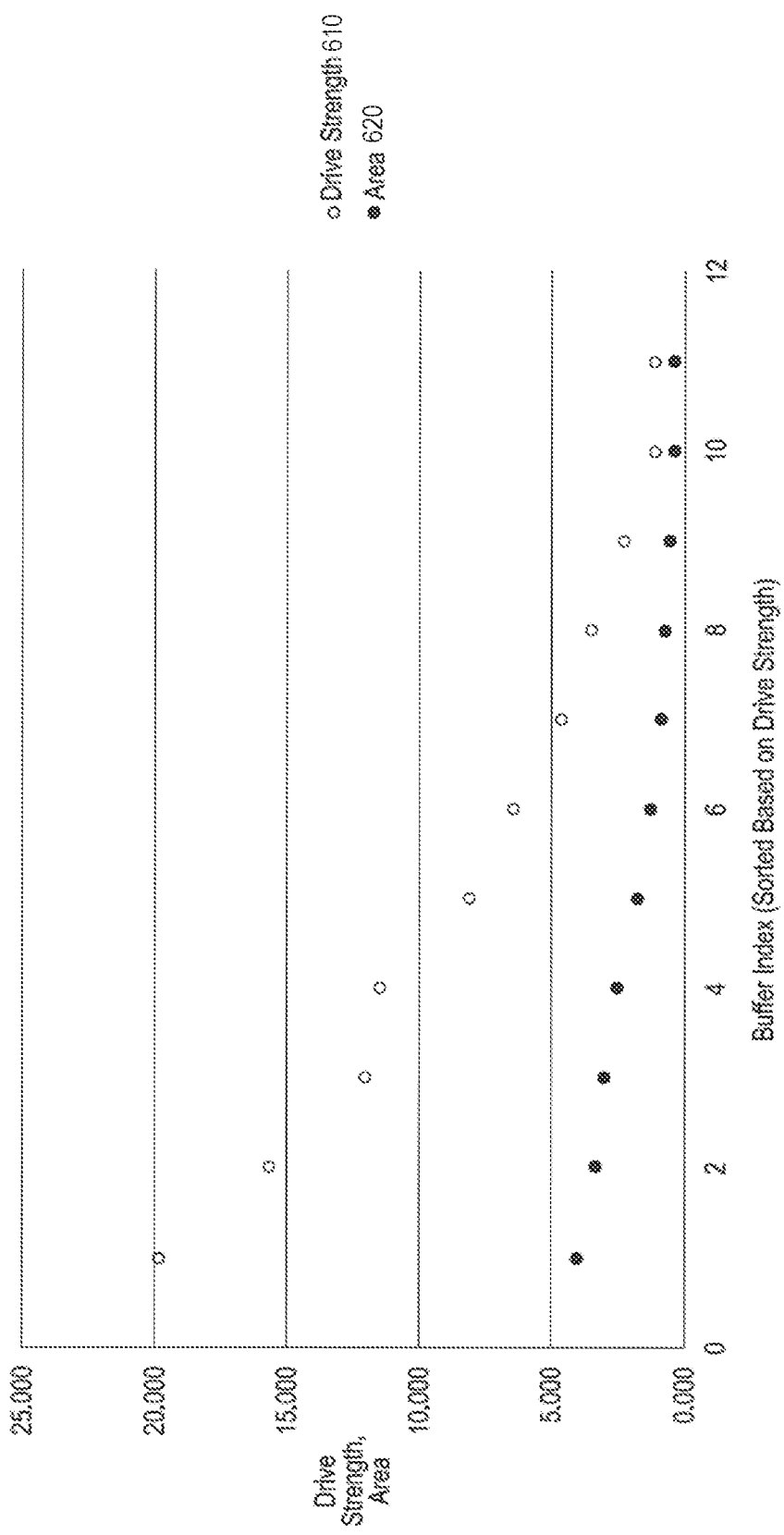
FIG. 6 illustrates aspects of clock cell library selection in accordance with some embodiments described herein.

FIG. 6 then shows cells of a trimmed library. These cells are sorted in a fashion similar to the sorting in FIG. 4, with each cell indexed and shown with an associated drive strength value 610 and a cell area value 620. In the trimmed cell library illustrated by FIG. 6, the area value 620 and drive strength value 610 are roughly correlated, and the total number of cells is greatly reduced. This results in cells with the greatest drive strength associated with a given area to be considered, and limits the time during clock tree synthesis that might otherwise be devoted to considering and using cells with inefficient power, area, and drive strength characteristics. In various other embodiments, other criteria may be used to limit the number of cells in the eventual trimmed cell library. For example, some cell libraries may have a threshold set on the total number of cells to be used, with additional criteria (e.g., similarity criteria and/or secondary characteristics) used to further limit the number of cells included in the trimmed library.

After the trimmed library (e.g., a cell library including the trimmed list cells 520 as shown in FIG. 6, which has been reduced from the set of all cells of FIG. 3) is generated, the trimmed library may then be stored in memory and accessed during clock tree synthesis to place cells within a routing tree (e.g., in positions such as placement areas 232, 234, and 236 of FIG. 2A) in accordance with the clock tree operation and circuit design limits.

Figure 7:
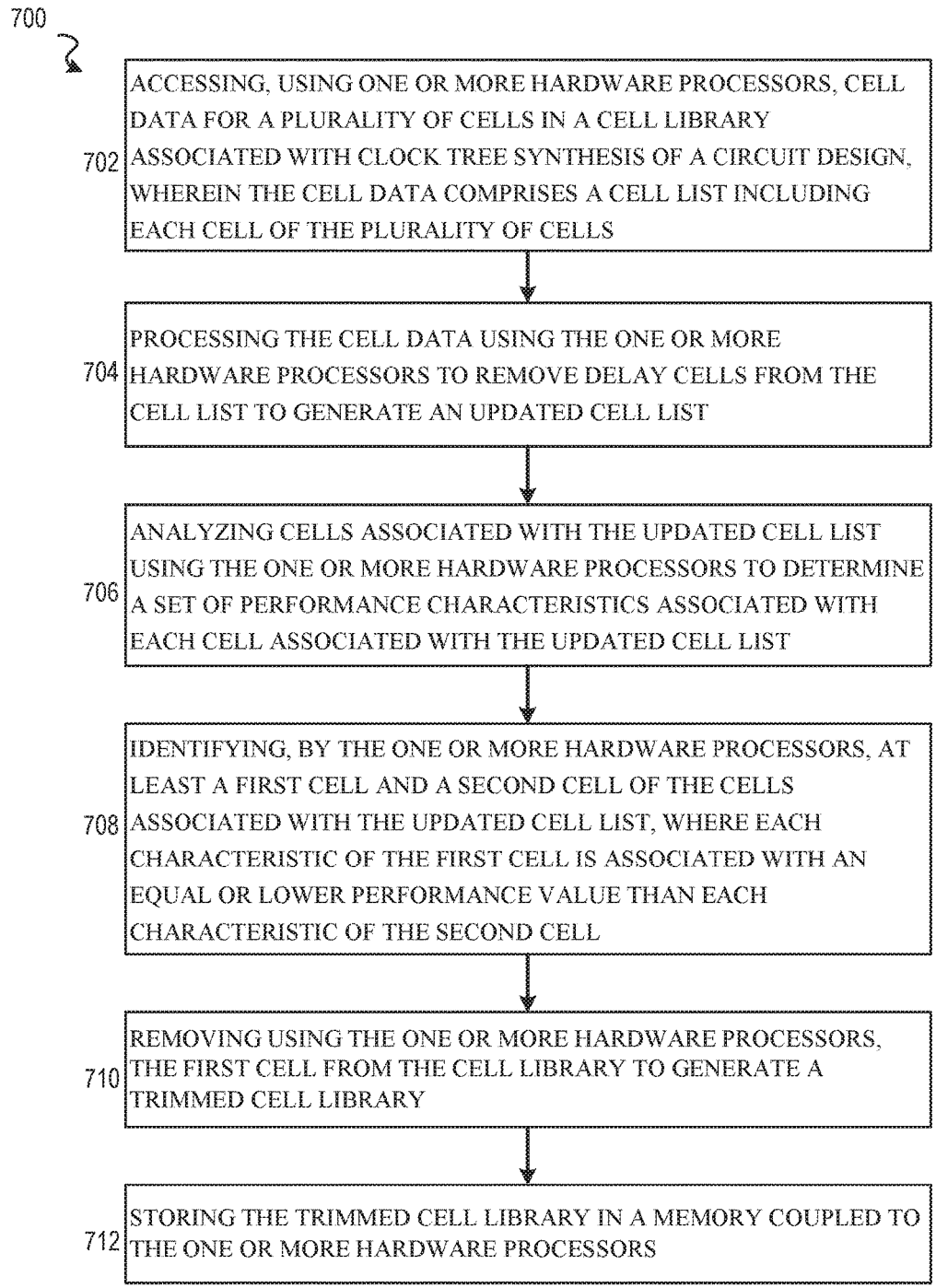
FIG. 7 describes a method for clock cell library selection for routing tree generation in accordance with some embodiments.
Figure 8:
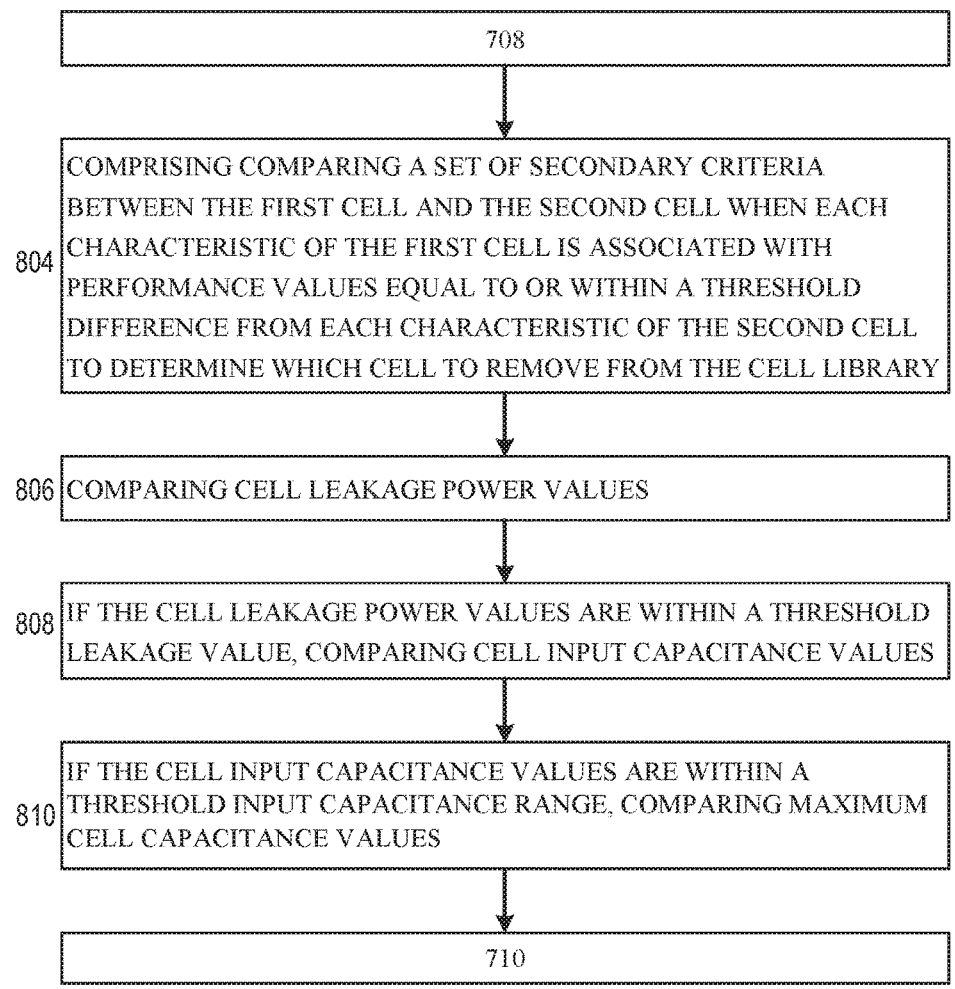
FIG. 8 describes a method for clock cell library selection for routing tree generation in accordance with some embodiments.
Figure 9:
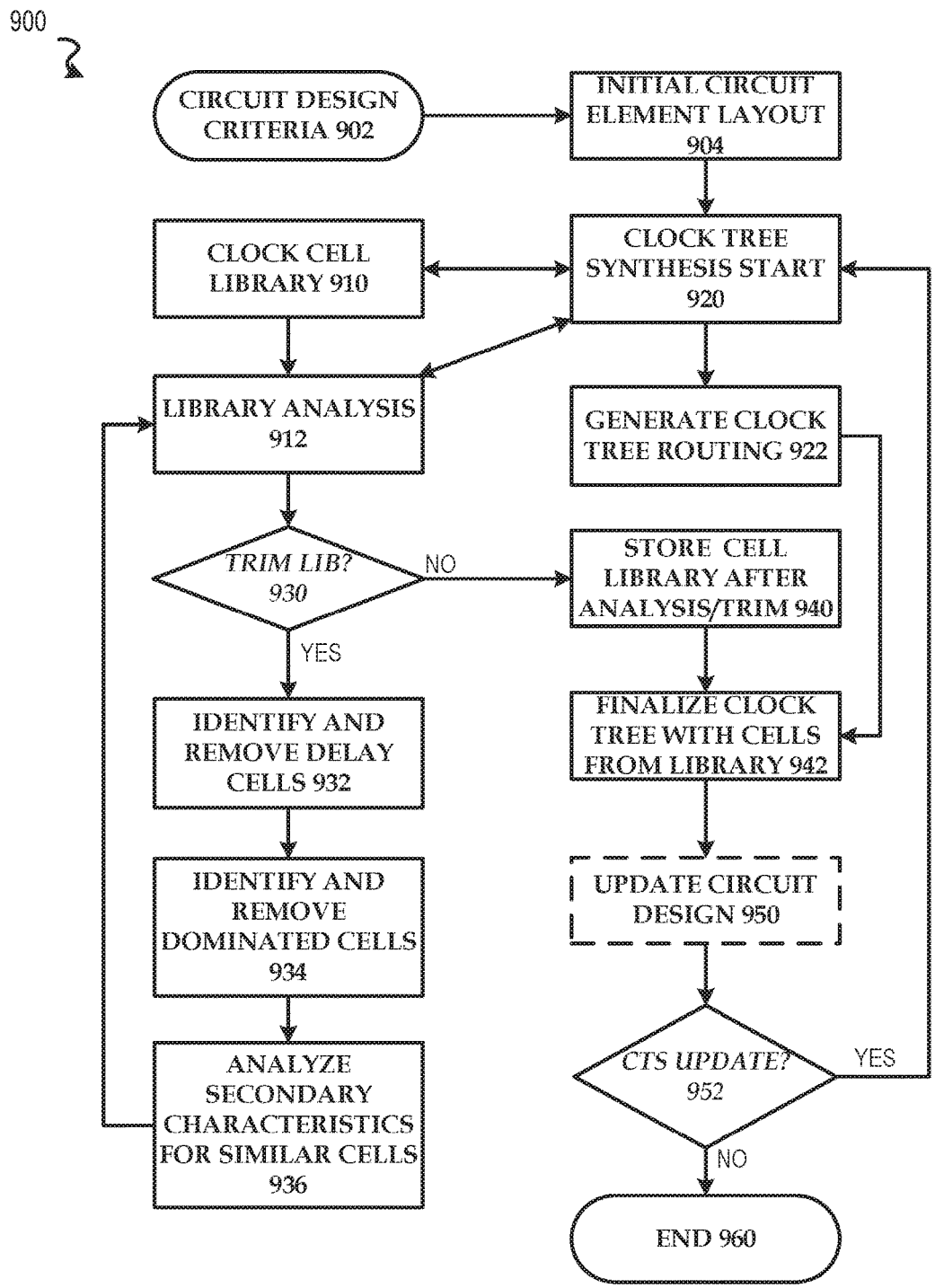
FIG. 9 describes a method for clock cell library selection for routing tree generation in accordance with some embodiments.

FIGS. 7-9 describe methods of clock cell library selection for routing tree generation in accordance with some embodiments. In some embodiments, these methods are performed by a computing device with one or more processors. In some embodiments, these methods are embodied in computer-readable instructions stored in a non-transitory storage device, such that when the instructions are executed by one or more processors of a device, the device performs the associated method.

Method 700 of FIG. 7 begins with accessing, using one or more hardware processors, cell data for a plurality of cells in a cell library associated with clock tree synthesis of a circuit design as part of operation 702. In some embodiments, the cell data comprises a cell list including each cell of the plurality of cells. The cell data may be structured in a variety of different ways in different embodiments, including being stored in any file format accessible by EDA applications used for clock tree synthesis. The cell data may include lists for different types of cells, including delay cells, buffer cells, inverter cells, and any other such category of cell. The cell data from the cell library may be identified by a command passed to an application by an operator, or may be accessed automatically by a default system setting. In some embodiments, operators passing cell data for a library may provide commands to select certain subsets of all available cells or clock cells, and the method may then proceed to further analyze and trim the cell library. In other embodiments, an operator may particularly select whether the operations of method 700 or any other similar method are used for library trimming.

After a system accesses the cell data in operation 702 and any relevant criteria for determining that library trimming should be considered are met (e.g., operator authorization, automatic default settings, etc.), operation 704 proceeds processing the cell data using the one or more hardware processors to remove delay cells from the cell list to generate an updated cell list. In some embodiments, delay cells are identified within the cell library. In other embodiments, a set of criteria used to define delay cells is compared against the characteristic of all cells in the cell library to identify delay cells. These may be cells with a given set of performance characteristics and varying delay characteristics, or any set of operator- or system-defined cell characteristics. In some embodiments, such delay cells are not considered for trimming in order to make appropriate delay values available to automated clock tree synthesis operations for reducing skew. The remaining non-delay cells (e.g., buffers, inverters, etc.) are used for other design purposes, and are subject to trimming to reduce analysis and automatic clock tree synthesis time. During clock tree synthesis, the delay cells are used to adjust the delay of certain routing paths, but may essentially be considered part of a separate library that is used for delay adjustments, while the trimmed library is used for selection of other cells (e.g., buffer or inverter cells) not related to delay cell considerations.

After an updated cell list is generated that excludes delay cells, the resulting updated cell list is analyzed in operation 706 using the one or more hardware processors to determine a set of performance characteristics associated with each cell associated with the updated cell list. As described above, in some embodiments, these characteristics consist of a cell area and a cell drive strength in some embodiments. In another embodiment, the characteristics consist of a power consumption value and a cell drive strength value. In other embodiments, other combinations of characteristics may be considered, and may include any number of characteristics per cell.

In some embodiments, the characteristics are determined directly from the cell data. Cell area values, for example, may be identified directly from the cell data describing the area taken by a cell when placed in a layout in some embodiments. In some embodiments, cell power consumption may be determined in a variety of different ways. Cell area may be considered a proxy for cell power consumption, and modified by various other characteristics of a cell, or the cell power consumption may be estimated based on current thresholds or other cell characteristics of the cell data.

In some embodiments, some characteristics are determined by modeling cells within an analysis environment. For example, cell drive strength may be determined by modeling a cell with standard inputs and loads. In one embodiment, each cell in the library is analyzed using a clock input with two different standardized loads. The computer model calculates a delay for each load, and then calculates a drive strength for each cell. In one example embodiment, the drive strength is calculated as:

$$S=(1/Dx-1/Dy)/(1/Da) \qquad [1]$$

where S is the cell drive strength value, Dx is a first delay measured during simulated driving of the first load, Dy is a second delay measured during simulated driving of the second load, and Da is a standardized value used to generate a unitless cell drive strength value that is appropriate to create cell drive strength values for easy comparison between cells. In other embodiments, other methods of determining cell drive strength are used.

After the characteristics to be used to compare cells are identified (and generated, if needed, by modeling, analysis, or calculation), operation 708 then involves comparing the values of different cells to select cells to remove from a trimmed library. In some embodiments, this involves identifying, by the one or more hardware processors, at least a first cell and a second cell of the cells associated with the updated cell list, where each characteristic of the first cell is associated with an equal or lower performance value than each characteristic of the second cell. In operation 710, the first cell is removed from the cell library to generate a trimmed cell library. The first cell may be considered "dominated" by the second cell due to the analyzed characteristics of the second cell all being associated with an equal or lower performance value. In various embodiments, the actual value of the characteristics need not be lower. For example, a lower cell area is considered a higher performance value, and a larger or higher cell area is associated with a lower performance value. By contrast, a higher drive strength value is associated with a higher performance value. The particular comparison between different characteristics will thus depend on the details of the characteristic.

Operations 708 and 710 may then be repeated any number of times to further remove cells from the trimmed cell library. In some embodiments, a first cell is selected, and the system begins comparing the first cell with other selected cells. When the first cell dominates another cell, that cell is removed from the trimmed cell library. If another cell dominates the first cell, the first cell is removed from the trimmed cell library. If the first cell is compared with every other cell in the library without being dominated, that cell is included in the trimmed cell library. A second cell is then selected and the process repeats, with the second cell being compared against the remaining cells that have not previously been removed from the trimmed cell library. In some embodiments, this process is repeated until every cell in the library has either been removed or considered. In other embodiments, this process repeats until a specified number of cells have been removed to generate the trimmed cell library. In still further embodiments, this process repeats until a specified number of cells remain in the trimmed cell library. In other embodiments, various combinations of criteria are used to determine when to finalize and store the trimmed cell library.

In one embodiment, the cells are sorted by cell area and the drive strength of each cell when the criteria consist of cell area and drive strength. A trimmed cell library is generated by analyzing the sorted list to identify any corresponding dominated cell which has a larger cell area and smaller cell drive strength and removing any dominated cell from inclusion in the trimmed cell. In some such embodiments, the cell list comprises a buffer list associated with a set of buffer cells of the cell library and an inverter list associated with a set of inverter cells of the cell library, and the plurality of cells comprises the set of buffer cells, the set of inverter cells, and the delay cells. Cells are removed from the buffer and inverter lists to generated the trimmed cell library, and the remaining cells are used to synthesize the clock tree.

The trimmed cell library is then stored in a memory coupled to the one or more hardware processors as part of operation 712. In various embodiments, the trimmed cell library may be saved in memory and updated as each cell is considered, or may be saved in one memory (e.g., volatile memory) as the processing occurs, with the final trimmed library stored in another memory (e.g., non-volatile memory) after all cells have been considered.

FIG. 8 then illustrates method 800, which is used in conjunction with some embodiments of method 700 of FIG. 7. As detailed above, a first cell may be removed from a trimmed cell library as dominated when each characteristic of the first cell is associated with an equal or lower performance value than each characteristic of the second cell. In some embodiments, however, when all of the characteristics are equal or substantially equal (e.g., within a threshold value range for each characteristic), secondary characteristics may be compared to determine which cell to keep and which cell to remove from the trimmed cell library.

As cells are being considered during operation 708, a further operation to identify similar cells is performed by determining that each characteristic of the first cell is associated with performance values equal to or within a threshold difference from each characteristic of the second cell. When such similar cells are identified, comparisons between secondary criteria are initiated in operation 804. In various different embodiments, the secondary criteria may be compared in different ways. Different circuit designs may prioritize secondary characteristics differently, or may generate a secondary characteristic score that includes weighted values of multiple secondary characteristics, with the overall secondary characteristic score used for comparisons. Additionally, just as above for the primary characteristics considered at the first level of comparison, the secondary characteristics may be taken directly from cell data, calculated from cell data, or generated via various modeling or simulation processes.

In the example embodiment of method 800, the secondary comparison process involves multiple stages of comparisons between prioritized secondary characteristics. The first priority secondary characteristic is cell leakage power. In operation 806, cell leakage power values are compared between the similar cells. If one cell has a higher performance value for the cell leakage power value, that cell is selected for inclusion and the other cell is removed (e.g., trimmed) from the trimmed cell library. If, however, the cell leakage power values are again equal or within a threshold difference from each other, the process continues to another level of secondary characteristic comparison. In the embodiment of method 800, the next level of secondary comparison is a cell input capacitance; if the cell leakage power values are within the threshold difference, in operation 808, the cell input capacitance values are compared. Operation 810 commences if the cell input capacitance values are within a threshold input capacitance range and compares maximum cell capacitance values. This process may continue for any number of secondary characteristics.

If all secondary characteristics are within a threshold range, a final determination may be made in a variety of ways. In some embodiments, secondary characteristics that are within a threshold range, but not equal, may be used. For example, if operation 810 concludes with all secondary values within a threshold range, but the cell leakage power values or a primary characteristics value is not exactly equal, this difference may be used to select a cell for exclusion even though it is within a threshold similarity of another cell. In other embodiments, a random or order-based selection process is used. After the final determination is made, the process continues to update the trimmed cell library in operation 710 and continue comparing any remaining cells until all cells are considered or other criteria are met and the final trimmed cell library is set.

FIG. 9 then illustrates an additional method 900 described by the process flow diagram of FIG. 9. This method 900 includes library cell selection within a larger context of a circuit design and generation of an updated design and an associated circuit, as discussed above with respect to FIG. 1.

Method 900 begins with circuit design criteria 902 provided as part of EDA operations to generate a circuit design. In operation 904, an initial circuit element layout is generated with placement of circuit elements (e.g., sinks) that use a clock signal from a clock tree. Once the elements and a source have an initial placement, clock tree synthesis may begin in operation 920. In various design operations, other operations or analysis processes may be performed in any order, but method 900 provides one example embodiment. The variations may include embodiments where a clock cell library 910 is analyzed and trimmed before clock tree synthesis begins in operation 920. In other embodiments, designers select sets of cells to use for clock tree synthesis as part of circuit design criteria 902 or an input to begin clock tree synthesis at operation 920. Regardless of when this occurs, in accordance with embodiments described herein, a clock cell library 910 is analyzed in an operation 912.

An initial analysis may determine in operation 930 that no trimming is to be performed, or that a set of criteria (e.g., number of cells) is already met. If this decision for trimming is a no at operation 930, the base cell library is used for clock tree synthesis continuing in operation 940. If the library is to be trimmed, the operations described above are performed to generate a trimmed cell library. This includes identifying and removing delay cells in operation 932, identifying and removing dominated cells in operation 934, and removing cells using secondary considerations for similar cells in operation 936.

In some embodiments, an initial set of criteria may be used for a first set of library trimming operations, and if library trimming criteria are not met after an initial loop, different criteria may be applied in operation 930. Thus, multiple loops of library trimming operations 932, 934, and 936 may be performed with different criteria used at each loop. For example, similarity criteria may be expanded in later loops, with similar cells removed in order to further limit the number of cells processed during placement of cells during subsequent clock tree synthesis. After any such operations for selecting cells in a library are finalized, the trimmed cell library is stored in operation 940.

After the clock tree synthesis starts in operation 920, an initial clock tree routing is generated in operation 922, which generates clock paths as illustrated in FIG. 2A between a source and the sinks that receive a clock signal from the source. The trimmed cell library from operation 940 is then used to update and finalize a clock tree in operation 942. This may, in various embodiments, involve identification of cell placement points and then selection of cells to be used at the cell placement points from the trimmed cell library (e.g., as described above with respect to FIGS. 2A-C. After the clock tree is synthesized in operation 942, additional circuit design updates, testing, simulation, and other such operations may occur as part of circuit design updates 950 (e.g., any operations of FIG. 1 related to circuit design updates). Following circuit design updates, if any, an analysis may be performed to determine if updates to the clock tree are specified in decision operation 952. If so, operation 920 may begin a revision of the clock tree. This may be based on circuit elements being moved from the initial circuit layout, timing criteria not being met, or any other such circuit design changes. The updates may be analyzed to determine that an alternate clock library should be used, in which case the analysis loop will be repeated; however, in some embodiments, the same trimmed clock library may be used to update a clock tree. This process will then continue until the circuit design is finalized.

The above is merely one example embodiment. Other process flows may be used based on the specific implementation of a circuit generation in different embodiments.

While particular methods and operations are discussed above, it will be apparent that additional intervening or repeated operations are possible within the scope of the various embodiments described herein. Some circuit designs may include multiple clock trees, and the embodiments described herein may be applied to each clock tree. Additionally, other embodiments are possible that use different orderings, that use the operations described above to generate a trimmed cell library, and that use the trimmed cell library as part of clock tree synthesis in an EDA computing process and environment. Any such embodiments may be used to reduce clock tree synthesis time with a trimmed library.

Figure 10:
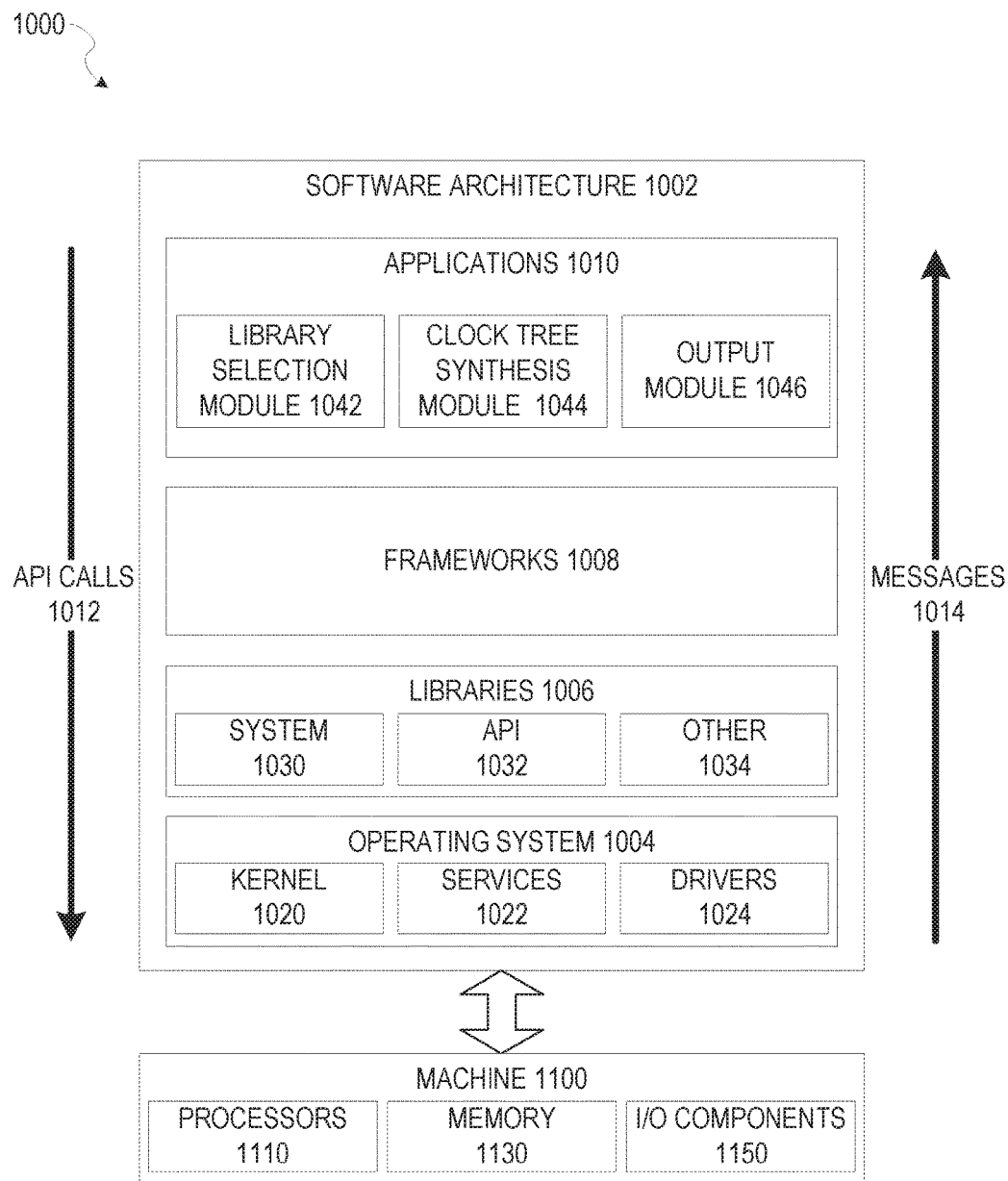
FIG. 10 is a block diagram illustrating an example of a software architecture that may be operating on an electronic design automation (EDA) computer and used with methods for clock cell library selection and routing tree generation according to some example embodiments.

FIG. 10 is a block diagram 1000 illustrating an example of a software architecture 1002 that may be operating on an electronic design automation (EDA) computer and used with methods for selecting cells for a cell library and generating a routing tree using the cell library, according to some example embodiments. Software architecture 1002 can be used as an electronic design automation computing device to implement any of the methods described above. Aspects of software architecture 1002 may, in various embodiments, be used to store circuit designs and execute analysis or optimization in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as machine 1100 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or any other device described herein, may operate using elements of software architecture 1002. An EDA computing device described herein may additionally be implemented using aspects of the software architecture 1002, with the architecture 1002 adapted for operating to generate a cell library and perform clock tree synthesis in accordance with embodiments herein.

In one embodiment, an EDA application of applications 1010 performs routing tree generation and/or adjustments, according to embodiments described herein, using various modules within software architecture 1002. For example, in one embodiment, an EDA computing device similar to machine 1100 includes memory 1130 and one or more processors 1110. The processors 1110 implement a library selection module 1042 to generate select cells for a trimmed cell library as described in various embodiments herein. The processors 1110 also implement a clock tree synthesis module 1044 to use cells from the trimmed cell library to generate a clock tree that meets criteria associated with a circuit design. The routing tree is finalized by an output module 1046 if the criteria/design thresholds are met, and updated by clock tree synthesis module 1044 if the criteria/design thresholds are not met.

In some embodiments, processor-implemented output module 1046 may then be used to update a display of I/O components 1150 of the EDA computing device with data associated with the updated routing tree generated by the process.

In various other embodiments, rather than being implemented as modules of one or more applications 1010, some or all of modules 1042, 1044, and 1046 may be implemented using elements of libraries 1006 or operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of multi-instance blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files and viewdefinition files are examples that may operate within a software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an application program interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
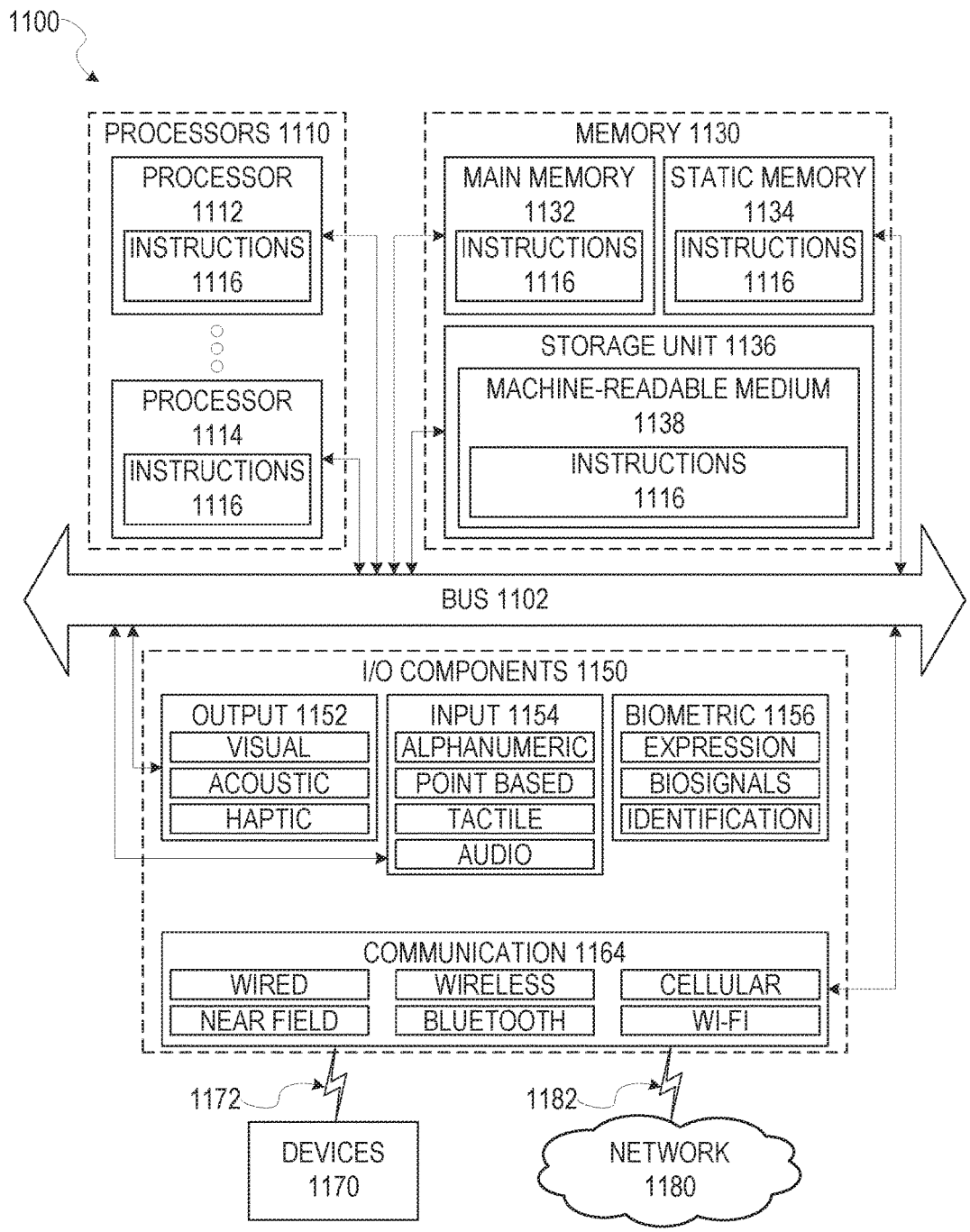
FIG. 11 is a diagrammatic representation of a machine in the form of a computer system within which a set of instructions are executed, causing the machine to perform any one or more of the methodologies discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. In some embodiments, the machine 1100 may operate with instructions 1116 (e.g., software, a program, an application, an applet, an app, or other executable code) for causing the machine 1100 to perform any one or more of the methodologies discussed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like. Biometric components 1156 may also be used as inputs in various embodiments.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements", "design elements", and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium 1138 is incapable of movement; the medium 1138 should be considered as being transportable from one physical location to another. Additionally, since the machine-readable medium 1138 is tangible, the medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for electronic design automation, the computerized method comprising:

accessing, using one or more hardware processors, cell data for a plurality of cells in a cell library associated with a clock tree synthesis of a circuit design, wherein the cell data comprises a cell list including each cell of the plurality of cells;

processing the cell data using the one or more hardware processors to remove delay cells from the cell list to generate an updated cell list;

analyzing, by the one or more hardware processors, cells associated with the updated cell list using the one or more hardware processors to determine a set of performance characteristics associated with each cell associated with the updated cell list;

identifying, by the one or more hardware processors, at least a first cell and a second cell of the cells associated with the updated cell list, where each characteristic of the first cell is associated with an equal or lower performance value than said each characteristic of the second cell;

removing, using the one or more hardware processors, the first cell from the cell library to generate a trimmed cell library; and storing the trimmed cell library in a memory coupled to the one or more hardware processors.

2. The computerized method of claim 1, wherein the set of performance characteristics comprises a cell area and a cell drive strength.

3. The computerized method of claim 2, wherein at least a first characteristic of the first cell is associated with a first lower performance value when compared to the first characteristic of the second cell.

4. The computerized method of claim 3, wherein the cell area of the first cell is equal to the cell area of the second cell, and wherein the first characteristic is the cell drive strength.

5. The computerized method of claim 4, further comprising:

determining a cell drive strength value for each cell of the plurality of cells by simulating an operation of each cell.

6. The computerized method of claim 5, wherein the simulating the operation of each cell to determine the cell drive strength value for each cell comprises simulating each cell driving at least a first load and a second load, and calculating the cell drive strength value as:

$$S=(1/Dx-1/Dy)/(1/Da),$$

wherein S is the cell drive strength value, Dx is a first delay measured during simulated driving of the first load, Dy is a second delay measured during simulated driving of the second load, and Da is a standardized delay value.

7. The computerized method of claim 1, further comprising comparing a set of secondary criteria between the first cell and the second cell when each characteristic of the first cell is associated with performance values equal to or within a threshold difference from said each characteristic of the second cell; and removing the first cell from the cell library to generate the trimmed cell library based on the set of secondary criteria; and wherein the set of secondary criteria comprises one or more of a cell leakage current, a cell input capacitance, and a cell maximum capacitance.

8. The computerized method of claim 2, further comprising:
sorting the plurality of cells by the cell area and the cell drive strength of each cell of the plurality of cells;
generating the trimmed cell library by analyzing cells of the plurality of cells to identify any corresponding dominated cell which has a larger cell area and a smaller cell drive strength; and
removing any dominated cell from inclusion in the trimmed cell library.

9. The computerized method of claim 8, wherein the plurality of cells is analyzed to identify any corresponding dominated cell until all cells of the plurality of cells have either been analyzed or excluded from the trimmed cell library as dominated cells.

10. The computerized method of claim 8, wherein the plurality of cells is analyzed to identify any corresponding dominated cell until a number of cells in the trimmed cell library is below a threshold number.

11. The computerized method of claim 1, wherein the set of performance characteristics comprises power consumption.

12. The computerized method of claim 1, wherein the cell list comprises a buffer list associated with a set of buffer cells of the cell library and an inverter list associated with a set of inverter cells of the cell library; and
wherein the plurality of cells comprises the set of buffer cells, the set of inverter cells, and the delay cells.

13. The computerized method of claim 2, further comprising:
generating a clock tree routing for the circuit design using the trimmed cell library.

14. The computerized method of claim 13, wherein the generating the clock tree routing for the circuit design using the trimmed cell library comprises:
determining a skew value for the clock tree routing;
comparing the skew value for the clock tree routing with a skew threshold; and
inserting one or more cells from the trimmed cell library into the clock tree routing to bring the skew value for the clock tree routing within the skew threshold for the circuit design.

15. The computerized method of claim 13, further comprising generating an integrated circuit comprising the circuit design and the clock tree routing.

16. A device for generating a circuit design, comprising:
a memory configured to store cell data for a plurality of cells in a cell library associated with a clock tree synthesis of a circuit design, wherein the cell data comprises a cell list including each cell of the plurality of cells; and
one or more processors coupled to the memory and configured to perform operations for generating a trimmed cell library by:
analyzing the plurality of cells using the one or more processors to determine a set of performance characteristics associated with each cell of the plurality of cells;
identifying, by the one or more processors, at least a first cell and a second cell of the plurality of cells, where aid each characteristic of the first cell is associated with an equal or lower performance value than aid each characteristic of the second cell;
removing, using the one or more processors, the first cell from the cell library to generate a trimmed cell library; and
storing the trimmed cell library in the memory coupled to the one or more processors.

17. The device of claim 16, wherein the memory is further configured to store a circuit design comprising a source and a plurality of sinks; and
wherein the one or more processors are further configured to generate a clock tree for the circuit design by:
generating a clock tree routing connecting the source and the plurality of sinks;
determining a skew value for the clock tree routing;
comparing the skew value for the clock tree routing with a skew threshold; and
adjusting the clock tree routing at least in part by inserting one or more cells from the trimmed cell library into the clock tree routing, wherein the clock tree routing is adjusted to bring the skew value for the clock tree routing within the skew threshold for the circuit design.

18. A non-transitory computer-readable storage medium comprising instructions that, when executed by one or more processors of a computing device, cause the computing device to perform operations for electronic design automation comprising:
accessing, using the one or more processors, cell data for a plurality of cells in a cell library associated with a clock tree synthesis of a circuit design, wherein the cell data comprises a cell list including each cell of the plurality of cells;
processing the cell data using the one or more processors to remove delay cells from the cell list to generate an updated cell list;
analyzing cells associated with the updated cell list using the one or more processors to determine a cell area and a cell drive strength for each cell associated with the updated cell list;
sorting the plurality of cells associated with the updated cell list by the cell area and the cell drive strength of each cell of the plurality of cells;
identifying a set of dominated cells by analyzing cells of the plurality of cells to identify any corresponding dominated cell which has an equal or larger cell area value and a smaller cell drive strength value;
generating a trimmed cell library by removing any dominated cell from the cell list to generate the trimmed cell library without the dominated cells; and
storing the trimmed cell library in a memory coupled to the one or more processors.

19. The non-transitory computer readable medium of claim 18, wherein the instructions further cause the one or more processors to perform operations comprising:
identifying the set of dominated cells by:
analyzing cells of the plurality of cells to identify any corresponding cell which has an area and a cell drive strength within a threshold value range; and
sequentially comparing a set of secondary characteristics between cells with the area and the cell drive strength within the threshold value range.

20. The non-transitory computer readable medium of claim 19, wherein the sequentially comparing the set of the secondary characteristics comprises:
comparing cell leakage power values, wherein
if the cell leakage power values are within a threshold leakage value, comparing cell input capacitance values, and if the cell input capacitance values are within a threshold input capacitance range, comparing maximum cell capacitance values.

* * * * *